H. W. BLAISDELL & J. R. BROWN.
MOBILE HYDROMETALLURGICAL APPARATUS.
APPLICATION FILED SEPT. 15, 1906.
907,309.
Patented Dec. 22, 1908.
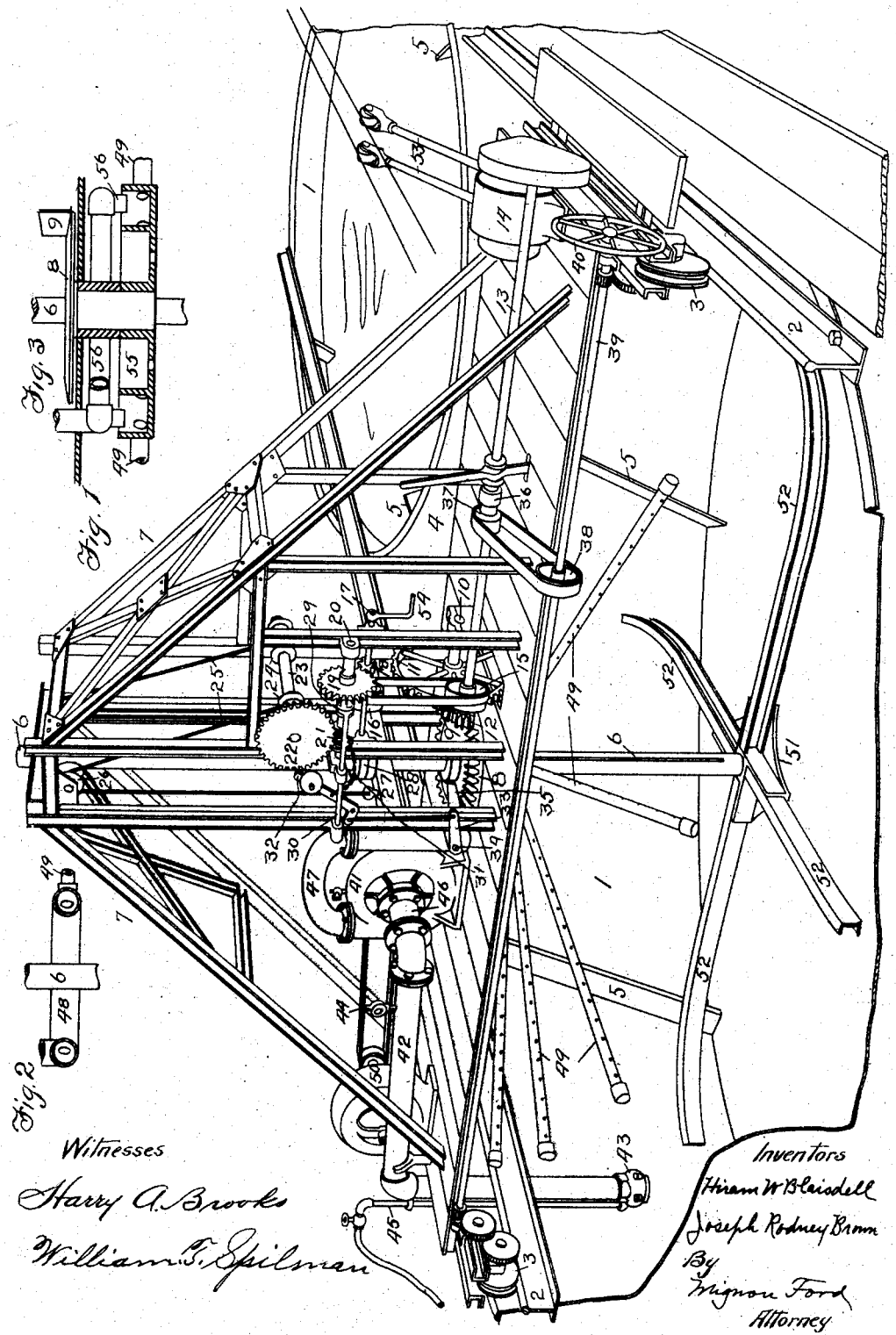
Witnesses
Harry A. Brooks
William F. Spilman
Inventors
Hiram W. Blaisdell
Joseph Rodney Brown
By
Mignon Ford
Attorney

UNITED STATES PATENT OFFICE.

HIRAM W. BLAISDELL AND JOSEPH RODNEY BROWN, OF LOS ANGELES, CALIFORNIA, ASSIGNORS TO BLAISDELL COMPANY, OF LOS ANGELES, CALIFORNIA, A CORPORATION OF CALIFORNIA.

MOBILE HYDROMETALLURGICAL APPARATUS.

No. 907,309.     Specification of Letters Patent.     Patented Dec. 22, 1908.

Application filed September 15, 1906. Serial No. 334,801.

*To all whom it may concern:*

Be it known that we, HIRAM W. BLAISDELL and JOSEPH RODNEY BROWN, citizens of the United States, residing at Los Angeles, in the county of Los Angeles and State of California, have invented certain new and useful Mobile Hydrometallurgical Apparatus; and we do hereby declare the following to be a full, clear, and exact description of the invention, such as will enable others skilled in the art to which it appertains to make and use the same.

This invention relates to hydro-metallurgical apparatus and has among other objects, the elimination of the long line of shafting hitherto in use in agitating vats, which must be kept running, even though the contents of only one vat is being operated on, entailing wear of the apparatus and needless expenditure of power.

Another object of the invention is to dispense with the great length of piping required under the old construction, which increases enormously the amount of power required to operate the pump used to circulate the contents of the vat.

Another object of the invention is to provide a machine for aerating and agitating the contents of such vats which may be used in any one of a series of vats.

A further object of this invention is to provide in an apparatus of this class means by which the circulated slimes may be returned to the vat in a series of small streams, whereby said slimes are brought more thoroughly into contact with the air.

Still a further object is to provide means whereby the contents of the vat next the bottom may be caused to rise to the surface thereby thoroughly commingling and uniformly aerating said contents.

In the drawings accompanying and forming part of this specification, Figure 1 is a general perspective view of the apparatus, partly broken away. Fig. 2 is a section of the device through which the material is returned to the tank. Fig. 3 is a sectional view of an alternative construction of the above.

Reference numeral 1 designates a tank or vat, adjacent to the sides of which or a row of which are supported rails 2, whereupon the wheels 3 of the traveling structure 4 are adapted to travel. Around the edges of tank 1 baffle boards 5 inclined at an angle to the vertical are supported in any suitable manner. A shaft 6 is mounted in a bearing in the central portion of the traveling structure and also in a bearing supported by a truss 7, forming a part of said structure. A bevel gear 8 is splined to shaft 6 and meshes with a bevel pinion 9 on shaft 10 which has a gear 11 driven by pinion 12 on power shaft 13, which receives motion through suitable gearing from motor 14. On shaft 13 is a pulley 15, belted to pulley 16 on shaft 17, fast to which is a spur pinion 18, meshing with a gear 19, on a shaft 20, whereon is a worm 21, meshing with a gear 22 on a shaft 23, whereon are drums 24 on which are fast cables 25, which pass over pulleys 26 down to a crosshead 27 supporting a collar 28 fast to shaft 6. Mounted on shaft 20 is a clutch 29 having an operating rod 30 which is connected by a chain or other flexible device 31 to lever 32, the shorter arm of which is connected by a link to lever 33 on the shaft 34, on which is a contact lever 35.

On shaft 13 is a clutch 36, the loose member of which is connected to the pulley 37 belted to a pulley 38 on a shaft 39, which by suitable gearing transmits motion to the wheels 3 of the traveling structure 4. A hand wheel 40 is provided at the end of shaft 39, whereby the latter may be moved to adjust the apparatus over the center of any vat, as may be desired.

Upon the traveling structure 4 is mounted a pump 41 having a suction tube 42, provided with a foot valve 43. An air inlet 44 is provided on suction tube 42 and a tube 45 is arranged to discharge a stream of water into suction tube 42 above the foot valve 43. Suction tube 42 is connected to pump 41 with a flexible joint 46. The outlet of pump 42 is provided with a bend or trap 47 which communicates with an annular casting 48, Fig. 2, which has perforated arms 49. A motor 50 is provided to drive pump 41. At the lower end of shaft 6 is a casting 51, to which are bolted arms 52, preferably formed of channel iron, the outer ends being curved backward as regards their direction of rotation.

A trolley 53 is provided to transmit current to motors 14 and 50. A hand crank 54 is provided on the end of shaft 17.

In the alternative construction shown in Fig. 3, the casting 55 is mounted upon a prolongation of the hub of gear 8 and the fluid from pump 41 is delivered thereto by branch pipes 56.

The mode of operation of this invention is as follows: The shaft 6 and its appurtenances, also the suction pipe 42 being in a raised position, the traveling structure 4 is moved along the rails 2 until the shaft 6 is over the central part of any one of the vats whose contents it is desired to operate upon. The suction pipe is then lowered. Motor 50 is then started, causing the pump 41 to draw the slimes to the suction pipe 42 and discharge them into the vat in a series of fine streams through the holes in perforated arms 44. Should the foot valve 43 be clogged, water may be admitted into the tube 45 thereby washing away any sediment which may obstruct the valve. If desired, air inlet 44 may be opened, allowing air to enter the suction conduit and be thoroughly mingled with the slimes being withdrawn from and discharged into the tank. Motor 14 being started, motion is imparted to shaft 13, pinion 12, gear 11, bevel pinion 9 and bevel gear 8, to shaft 6, thereby rotating the agitator arms 52. The curved ends of the arms 52 cause the contents of the vat to be driven against the baffle boards 5, which by their inclination, cause it to rise to the surface, thus establishing a circulation outwardly at the bottom of the vat and inwardly at the surface of the material being treated. As the material in the vat becomes loosened, the agitator may be lowered by the cables being unwound from drums 24 by motion transmitted from shaft 13 through the connections previously described. When the agitator arms approach the bottom of the vat, crosshead 27 contacts with lever 35 which disengages clutch 29 by means of the hereinbefore mentioned devices, connecting said clutch and lever, whereby further downward movement of the agitator is prevented. It is to be understood that when pump 41 is stopped, the foot valve 43 retains sufficient fluid therein to obviate the necessity of priming, the raised portion of the discharge pipe preventing the water running off through the outlet.

Claims.

1. Containing means, a traveling structure adjacent thereto and adjustable in position for operating on material in said containing means, an agitator and an aerator supported by said structure, and means for operating said agitator and aerator.

2. In hydro-metallurgical apparatus a series of vats and a traveling structure supporting an agitator and an aerator adapted to operate upon the contents of said vats.

3. Containing means, a traveling structure adjacent thereto and adjustable in position for operating on material in said containing means, a rotary agitator and an aerator carried by said structure, with means for operating the same.

4. Containing means, a traveling structure adjacent thereto and adjustable in position for operating on material in said containing means, a rotary agitator and a centrifugal pump carried by said structure, and means for operating the same.

5. A series of vats, a traveling structure associated therewith, a pump supported thereby, a conduit connecting said pump with one of the vats and means for supplying air to said conduit.

6. A series of vats, a traveling structure associated therewith, a pump supported by said structure, a jointed conduit leading from one of said vats to said pump and means for supplying air to said conduit.

7. Containing means, a traveling structure adjacent thereto and adjustable in position for operating on material in said containing means, an agitator and an aerator carried by said structure with motors for operating the same, power transmitting connections operated by one of said motors for progressing said traveling structure.

8. A series of vats, a traveling structure associated therewith, a pump mounted on said structure, a conduit leading from one of said vats to said pump and means connected to the outlet of said pump for distributing fluid in said vats.

9. A series of vats, a traveling structure associated therewith, a pump mounted on said structure, a conduit supplying fluid to said pump, a member connected to the outlet of said pump and a plurality of perforated pipes connected to said member.

10. A series of vats, a traveling structure associated therewith, a pump mounted thereon, a conduit supplying fluid to said pump and a rotary member to receive fluid from said pump and distribute the same in the vats.

11. Vats containing material to be operated on, a traveling structure associated therewith and adjustable in position for operating on the contents of a vat, a pump on said structure, a conduit leading into said vat and connected to said pump, and means connected to the outlet of said pump for distributing fluid over the surface of the contents of the vat.

12. Vats containing material to be operated on, a traveling structure associated therewith and adjustable in position for operating on the material in any one of said vats, a pump on said structure, a conduit adapted to connect said pump with the contents of a vat and provided with an air inlet, and means connected to the outlet of said pump for distributing material over the surface of the contents of said vat.

13. In hydro-metallurgical apparatus, containing means, a traveling structure adjustable in position for operating on material in said containing means, a pump mounted on said structure, a suction conduit for said pump, a discharge conduit from said pump having a portion thereof elevated above said pump, and a foot valve in said suction conduit.

14. In hydro-metallurgical apparatus, containing means, a traveling structure adjustable in position for operating on material in said containing means, a pump mounted on said structure having a suction conduit, a foot valve in said conduit, a tube adapted to discharge fluid within said conduit above said foot valve, and a discharge conduit from said pump having a portion elevated above said pump.

15. A series of vats, baffle boards in said vats, a traveling structure carrying an agitator adapted to operate in any one of said vats and an aerator carried by said traveling structure.

16. A series of vats, a traveling structure, a centrifugal pump mounted upon said structure, a movable suction conduit adapted to connect said pump with any one of said vats and a foot valve in said conduit, and an outlet pipe from said pump having a portion raised above the pump.

17. A series of vats, a traveling structure, an agitator carried by said structure, baffle boards in said vats, a pump carried by said structure and a series of perforated pipes forming the outlet of said pump.

18. Containing means, a traveling structure adjacent to said containing means and adjustable in position to operate on the contents thereof, and means carried by said structure to distribute and aerate fluid in said containing means.

19. Containing means, a traveling structure adjacent to said containing means and adjustable in position to operate on the contents thereof, an appliance carried by said structure to distribute and aerate fluid, and means to supply fluid from said containing means to said appliance.

In testimony whereof, we have signed our names to this specification, in the presence of two subscribing witnesses at Los Angeles, county of Los Angeles, State of California, this 31st day of August, A. D. 1906.

HIRAM W. BLAISDELL.
JOSEPH RODNEY BROWN.

Witnesses:
  OWEN RICE,
  O. O. McREYNOLDS.